United States Patent
Ma et al.

(10) Patent No.: US 9,399,735 B2
(45) Date of Patent: Jul. 26, 2016

(54) MANNICH-BASE INHIBITOR FOR DECALCIFICATION, PREPARATION METHOD AND APPLICATION THEREOF

(75) Inventors: Ling Ma, Beijing (CN); Lei Li, Beijing (CN); Xinping Zhen, Beijing (CN); Chunge Niu, Beijing (CN); Zhongting Ma, Beijing (CN); Xiangjun Kong, Beijing (CN); Shuyan Yu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 427 days.

(21) Appl. No.: 13/990,389

(22) PCT Filed: Apr. 27, 2012

(86) PCT No.: PCT/CN2012/000566
§ 371 (c)(1),
(2), (4) Date: May 29, 2013

(87) PCT Pub. No.: WO2013/026251
PCT Pub. Date: Feb. 28, 2013

(65) Prior Publication Data
US 2013/0256602 A1  Oct. 3, 2013

(30) Foreign Application Priority Data
Aug. 19, 2011  (CN) .......................... 2011 1 0240108

(51) Int. Cl.
*C09K 15/30* (2006.01)
*C10G 75/02* (2006.01)
*C23F 11/14* (2006.01)

(52) U.S. Cl.
CPC ............... *C09K 15/30* (2013.01); *C10G 75/02* (2013.01); *C23F 11/14* (2013.01); *C23F 11/141* (2013.01); *C23F 11/149* (2013.01)

(58) Field of Classification Search
None
See application file for complete search history.

(56) References Cited

FOREIGN PATENT DOCUMENTS

| CN | 1224078 A | 7/1999 |
|---|---|---|
| CN | 1231347 A | 10/1999 |
| CN | 1388271 A | 1/2003 |
| CN | 1419573 A | 5/2003 |
| CN | 1761715 A | 4/2006 |
| CN | 101130702 | 2/2008 |
| CN | 101182296 A | 5/2008 |
| CN | 101451242 A | 6/2009 |
| CN | 100577877 C | 1/2010 |
| CN | 102051622 A | 5/2011 |
| SU | 1550919 | 10/1992 |

OTHER PUBLICATIONS

Machine Translation of CN 101130702.*
English translation of PCT International Search Report dated Aug. 16, 2012 for PCT application No. PCT/CN2012/000566.
Duan Xiaoyun, et al., "Synthesis of a Mannich Base Inhibitor", Technology & Development of Chemical Industry, 2008, vol. 37, No. 9, pp. 11-12, 42.
Zheng Haihong, et al., "Synthesis and Performance Evaluation of YZ-1 Acidizing Corrosion Inhibitor", Corrosion & Protection in Petrochemical Industry, 2008, vol. 25(4), pp. 8-10.
Tian Faguo, et al., "Development and Performance Evaluation of a Novel Aciding Corrosion Inhibitor SYB at High Temperature for Oil Wells", Chemical Engineering of Oil & Gas, 2009, 38(5), pp. 426-429 and 433.
Wang Jingguang, et al., "Study and Development of a Mannich based Corrosion Inhibitor for Hydrochloric Acid Acidifying", Journal of Xi'an Shiyou University (Natural Science Edition), 2007, 22(3), pp. 77-79.

* cited by examiner

*Primary Examiner* — Tanisha Diggs
(74) *Attorney, Agent, or Firm* — Mintz Levin Cohn Ferris Glovsky and Popeo, P.C.

(57) ABSTRACT

A mannich-base inhibitor for decalcification, a preparation method and application thereof are provided. The inhibitor comprises 10-80% mannich-base component calculated in the total weight percent of the inhibitor, while the rest is at least one compound selected from imidazoline inhibitor with molecular weight between 110 and 750, and alkynyloxy amine inhibitor. The mannich-base inhibitor component is prepared through mannich reaction with 1 mol organic polyamine containing three or more primary amine bases and/or secondary amine bases, 3-7 mol ketones, and 3-7 mol aldehydes. The inhibitor which can be effectively compounded and cooperated with oil demulsifying agent and oil decalcifying agent, have the advantages of stable property, strong absorbability, high film strength and film density with its inhibition rate exceeding 90%. The inhibitor is especially adapted for inhibiting the steel corrosion caused by the mixed medium of salt, acid and water from the desalination and dehydration apparatus of oil refinery below 160° C.

14 Claims, No Drawings

MANNICH-BASE INHIBITOR FOR DECALCIFICATION, PREPARATION METHOD AND APPLICATION THEREOF

RELATED APPLICATION

This application is a national stage application, filed under 35 U.S.C. §371, of PCT Application No. PCT/CN2012/000566, filed on Apr. 27, 2012, and claims priority to Chinese Patent Application No. 201110240108.4, filed on Aug. 19, 2011, the contents of which are incorporated herein by reference in their entireties for all purposes.

TECHNICAL FIELD

The present invention relates to a Mannich-base inhibitor for decalcification, and preparation and application thereof.

RELATED ART

With the extensive application of the tertiary oil recovery technology and the deterioration of properties of crude oil, the proportion of inferior crude oil having a high salt content and a high acid content is increased. When refineries process high-calcium heavy oil, problems such as deactivation of catalyst, aggravation of scale formation and coking in equipment, and high-ash content and low quality of coke products of coking process units occur, which seriously impacts the safe operation of refining units and the improvement of economic efficiency of enterprises. Since demetallization agents, used in a demetallization process are acid compounds, and some acidic products are derived during the implementation of a decalcification process, when these acidic substances coexist with removed salts under high temperature conditions, a variety of corrosive effects are superimposed, so that the corrosion rate is increased exponentially, and fierce corrosion is caused to the metal material in the production apparatus. Corrosion prevention can be implemented by using a high-performance corrosion inhibitor, without reconstruction of the apparatus, so the cost is low. Therefore, high-performance corrosion inhibitor is a simple anti-corrosion measure. Since 1970s, Mannich bases have been used as corrosion inhibitors, and initially used as preservatives in an antifreeze solution, and then used to treat the inner wall of a petroleum gas storage. With the increase of the well depth in oil exploration and exploitation and the widespread application of oil well acidification technology to increase production capacity of crude oils, due to the demand for high-temperature acidification and corrosion inhibitor, the application of Mannich-base inhibitors is promoted.

Relevant reference documents and patents are as follows. CN 1224078A and CN 1231347A respectively introduces a corrosion inhibitor that can merely inhibit corrosion of steel in a simple salt solution. CN 1388271A introduces a steel corrosion inhibitor that can be used in high-temperature acidic media (160° C. or less, for 20% hydrochloric acid or mud acid) and a preparation method thereof. ZL200610112532X introduces a corrosion inhibitor of a mixed media of salts, acids and water that can be used in a crude oil desalting and dewatering unit in a refinery and a preparation method thereof, where the corrosion inhibitor includes 10 wt % to 99.5 wt % of a main corrosion inhibitor and an auxiliary corrosion inhibitor as the balance. The main corrosion inhibitor is a high-temperature organic acid corrosion inhibitor synthesized by boric acid and an organic amine, and the auxiliary corrosion inhibitor includes one or more of commercially available corrosion inhibitors such as ketone-aldehyde-amine corrosion inhibitors, imidazoline corrosion inhibitors, and alkynoxy methylamine corrosion inhibitors.

Duan Xiaoyun and Li Pengjiang have synthesized a Mannich-base inhibitor with formaldehyde, cyclohexylamine and acetophenone as main raw materials through a Mannich reaction, and have studied the influence of the ratio of the raw materials formaldehyde, cyclohexylamine and acetophenone on the corrosion inhibition performance of the synthesized Mannich-base inhibitor [Duan Xiaoyun, Li Pengjiang. Research on synthesis of a Mannich-base inhibitor. Technology & Development of Chemical Industry. 2008, 37(9): 11-12]. The document "Synthesis and performance of YZ-1 acidification and corrosion inhibitor" reports a Mannich base acidification and corrosion inhibitor YZ-1 synthesized from formaldehyde, acetone and ethylenediamine as raw materials through a Mannich reaction. Good corrosion inhibition effect is achieved in hydrochloric acid, hydrofluoric acid and mud acid. The temperature resistance is up to 150° C. [Zheng Honghai, Li Jianbo, Mo Zhibing, et al. Synthesis and performance of YZ-1 acidification and corrosion inhibitor. Corrosion & Protection in Petrochemical Industry. 2008, 25(4): 8-10]. Tian Faguo, Li Jianbo, Yan Zilin, et al. from Southwest Petroleum University have prepared a Mannich base by using formaldehyde, acetophenone and ethylenediamine as raw materials through a Mannich reaction, where the Mannich base is then quaternized with benzyl chloride to obtain a Mannich base quaternary ammonium salt, and the resulting corrosion inhibitor product has good acid solubility and good compatibility with other acidification additives, is non-toxic and resistant to high temperature, and exhibits excellent corrosion inhibition performance in different acid solutions [Tian Faguo, Li Jianbo, Yan Zilin, et al. Preparation and performance evaluation of a novel oilfield high-temperature acidification and corrosion inhibitor SYB. Chemical Engineering of Oil and Gas. 2009, 38(5): 426-429]. "Preparation of a Mannich base hydrochloric acid acidification and corrosion inhibitor" reports a low-cost Mannich base prepared by using cyclohexylamine. The Mannich base can be used as a main agent of an oil and gas well acidification and corrosion inhibitor, and the corrosion tests indicate that, at 60° C., merely 0.5% of the Mannich base is added into 20% of industrial hydrochloric acid, the requirements of first-grade product of an acidification and corrosion inhibitor in the oil and gas industry standards can be met [Wang Jinguang, Yu Hongjiang, Li Qianding. Preparation of a Mannich base hydrochloric acid acidification and corrosion inhibitor. Journal of Xi'an Shiyou University (Natural Science). 2007, 22(3): 77-79]. Chinese Patent CN 100577877C discloses a method for synthesizing a Mannich base steel corrosion inhibitor mother liquid and a steel corrosion inhibitor mother liquid, where the method is to prepare a steel corrosion inhibitor from a secondary amine, an aldehyde, and an alkyl ketone, a cycloalkyl ketone, an aryl ketone, a haloalkyl ketone, a cycloalkyl ketone, or an aryl ketone through a Mannich reaction in an aqueous medium. CN 101451242A, namely, "High-temperature acidification and corrosion inhibitor used for Cr-containing oil pipe" discloses an acidification and corrosion inhibitor, where a main agent A includes: 25 parts to 35 parts of quaternary ammonium salt of quinoline or quaternary ammonium salt of a quinoline derivative, 5 parts to 10 parts of potassium iodide and 40 parts to 60 parts of an organic solvent methanol or formaldehyde; an auxiliary agent B includes: 30 parts to 50 parts of a Mannich base, 15 parts to 35 parts of propiolic alcohol, 5 parts to 15 parts of chromium chloride and 20 parts to 35 parts of formaldehyde; and in use, the ratio of A:B is 2 to 1.5:1. In CN 1761715A, a Mannich base curing agent for an epoxy system or a polyurethane system is synthesized by using a phenolic compound, formaldehyde and at least one polyamine, where an excessive amount of amine is used, so as to enable the phenolic compound to be completely reacted as far as possible without any residue, so as to make the product environmental friendly. CN 101182296A discloses a curing agent for an epoxy system or a polyurethane system, which is synthesized from a dimer of cyclohexanone, formaldehyde and at least one polyamine through a Mannich reaction, and similarly, an excessive amount of amine is used.

In the prior art, in synthesis of a Mannich-base inhibitor (namely, a ketone-aldehyde-amine corrosion inhibitor), the ratio of a ketone, an aldehyde, and an amine (a monoamine) is 1:1:1, or the ratio of a ketone, an aldehyde, and an amine (a diamine) is 2:2:1. Therefore, the resulting Mannich base has a linear structure, and the adsorption centers are distributed at one end or two ends of the molecule, and when contacting with a metal wall surface, the linear Mannich-base inhibitor exhibits end group adsorption, and the end having the adsorption center forms chemical or physical adsorption with the metal, and the other end extends outwards to form a hydrophobic layer. When forming a membrane on a metal surface, the linear Mannich-base inhibitor has the disadvantages that the adhesion is poor due to single point adsorption between the corrosion inhibitor and the metal wall surface, the membrane strength is low, the membrane compactness is poor, especially on a metal wall surface that has been eroded or is not smooth, it is difficult to form a membrane, or a membrane cannot be formed, and the corrosion inhibition capacity is poor.

SUMMARY

The present invention is directed to a Mannich-base inhibitor for decalcification, which is a decalcification and corrosion-inhibition agent with a Mannich-base inhibiting component having a multi-branched spatial structure or a chiral Mannich base inhibiting component as main agent, where the Mannich base inhibiting component is prepared from a ketone, an aldehyde and an organic polyamine containing more than three primary amino groups and/or secondary amino groups through a Mannich reaction, and the molar ratio of the raw materials is: the ketone:the aldehyde:polyamine (more than three primary amino groups and/or secondary amino groups)=$X_1:X_2:1$ ($X_1>2$, $X_2>2$), and at least three primary amino groups or secondary amino groups of the organic polyamine are respectively subjected to a Mannich reaction with the ketone and the aldehyde, that is, functional group graft of multiple amino groups is performed by fully using the organic polyamine, to obtain a Mannich-base inhibitor having a multi-branched structure.

The present invention is further directed to a method for preparing a Mannich-base inhibitor for decalcification, where the Mannich-base inhibitor for decalcification includes a Mannich base inhibiting component of 10% to 80% of the total weight of the Mannich-base inhibitor for decalcification, and one or more of imidazoline corrosion inhibitors and alkynoxy methylamine corrosion inhibitors as the balance. The preparation process is simple, the reaction condition is mild, and the energy consumption is low.

In a technical solution of the present invention, a Mannich-base inhibitor for decalcification is provided, which is prepared by the following steps. (1) Preparation of a Mannich base inhibiting component: 3 to 7 mol of a ketone and 3 to 7 mol of an aldehyde are added into a reactor, the pH value is adjusted to 2 to 6 with an acid, the temperature is controlled at 20° C. to 50° C., and the reactant is stirred for 20 to 30 min, and 1 mol of an organic polyamine and an organic solvent are added into the reactor with stirring; or an ketone, an aldehyde and an organic solvent of which the pH value has been adjusted are added to an organic polyamine, the temperature is controlled at 60° C. to 90° C., the reaction time is 1 to 3 hrs, after reaction, the system is heated to 110° C. under $N_2$ and reaction water is removed. (2) A Mannich base inhibiting component of 10% to 80% of the weight of the Mannich-base inhibitor for decalcification is cooled to 40° C. to 50° C., and at normal pressure, one or more auxiliary corrosion inhibitors of imidazoline corrosion inhibitors and alkynoxy methylamine corrosion inhibitors of 20% to 90% of the weight of Mannich-base inhibitor for decalcification is added with stirring, and blended for 1 to 3 hrs.

The ketone includes one or more of an aliphatic ketone, an alicyclic ketone, and an aromatic ketone. Cyclic inner ketone in the alicyclic ketone includes cyclohexanone, cyclopentanone, cycloheptanone, o-methyl cyclohexanone, p-methyl cyclohexanone, 2-methylcyclopentanone, 2-ethylcyclopentanone, 3-ethylcyclopentanone; and the aliphatic ketone, the aromatic ketone and other alicyclic ketone may be represented by the following formula:

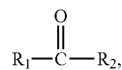

where $R_1$ and $R_2$ each independently represents a $C_1$ to $C_6$ alkyl, a $C_6$ to $C_9$ linear or branched aryl, and a $C_5$ to $C_9$ linear or branched cycloalkyl.

The aldehyde is formaldehyde or a compound that can be dissociated into formaldehyde such as polyformaldehyde, and preferably formaldehyde.

The organic polyamine is an organic compound contains more than three primary amino groups and/or secondary amino groups, and includes one or more of diethylenetriamine, triethylenetetramine, tetraethylenepentamine, pentaethylenehexamine, and hexaethyleneheptaamine.

The molecular weight of the imidazoline corrosion inhibitor is 110 to 750.

The alkynoxy amine corrosion inhibitor includes one or more of an alkynoxy methylamine, an alkynoxy methyl benzyl ammonium chloride, isopropyldipropynoxy methylamine, butyldipropynoxy methylamine, chclohexyldipropynoxy methylamine, n-hexyldipropynoxy methylamine, octyldipropynoxy methylamine, decyldipropynoxy methylamine, dodecyldipropynoxy methylamine, and tetradecyldipropynoxy methylamine.

During the preparation of the multi-branched Mannich-base inhibitor, the addition of the raw materials may be: adding the organic polyamine to the ketone and the aldehyde, or adding the ketone and the aldehyde to the organic polyamine, and preferably adding the organic polyamine to the ketone and the aldehyde. During the reaction, one organic solvent such as methanol, ethanol and petroleum ether is added, with ethanol being preferred; the acid used to adjust the pH value is one of hydrochloric acid, formic acid, and acetic acid, with hydrochloric acid being preferred.

In another technical solution provided by the present invention, a method of using a Mannich-base inhibitor for decalcification is provided, in which 30 to 2000 µg/g (relative to a corrosive media) of the corrosion inhibitor is added to the corrosive media and mixed uniformly, where the corrosive media is an aqueous solution of a water-soluble acid corrosive medium containing a water-soluble inorganic salt, especially a mixed media of salts, acids and water below 160° C. from a cure oil desalting and dewatering unit of a refinery.

The corrosive media is a mixed aqueous solution of a water-soluble inorganic salt and a water-soluble acid. The water-soluble inorganic salt may be one or more of soluble potassium salts, sodium salts and magnesium salts; and the water-soluble acid is a water-soluble inorganic acid and a water-soluble organic acid, and may be one or more of hydrochloric acid, hydrofluoric acid, formic acid, acetic acid, propionic acid and acetic anhydride.

DETAILED DESCRIPTION

In the following, the content of the Mannich base inhibiting component and the auxiliary corrosion inhibiting component are percentages based on the total weight of the Mannich-base inhibitor for decalcification.

Embodiment 1

3 mol of cyclohexanone and 3 mol of formaldehyde were respectively added into a reactor, the pH value was adjusted to 2 with hydrochloric acid, the temperature was controlled at 30±5° C., and mixture was stirred for 20 min. 1 mol of diethylenetriamine and 1.5 mol of an organic solvent methanol were added into the reactor with stirring, the temperature was controlled at 60° C., and the reaction was carried out for 3 hrs. After reaction, the system was heated to 110° C. in a nitrogen atmosphere, and the reaction water was removed, to obtain a Mannich base inhibiting component. Then, the Mannich base inhibiting component of 10% of the total weight of the Mannich-base inhibitor for decalcification was cooled to 40° C., and then, at normal pressure, a formic acid imidazoline corrosion inhibitor having a structural formula of

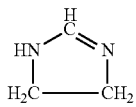

of 40% of the total weight of the Mannich-base inhibitor for decalcification, and an alkynoxy methylamine corrosion inhibitor of 50% of the total weight of the Mannich-base inhibitor for decalcification were added with stirring, and blended for 1 hr.

Embodiment 2

6 mol of acetophenone and 6 mol of formaldehyde were respectively added into a reactor, the pH value was adjusted to 3 with acetic acid, the temperature was controlled at 25±5° C., and the mixture was stirred for 25 min. 1 mol of pentaethylenehexamine and 2 mol of an organic solvent ethanol were added into the reactor with stirring, the temperature was controlled at 70° C., and the reaction was carried out for 2 hrs. After reaction, the system was heated to 110° C. in a nitrogen atmosphere, and the reaction water was removed, to obtain a Mannich base inhibiting component. Then, the Mannich base inhibiting component of 20% of total weight of the Mannich-base inhibitor for decalcification was cooled to 50° C., and then, at normal pressure, a naphthenic acid imidazoline corrosion inhibitor having a structural formula of

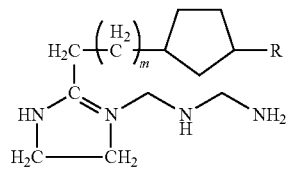

and an average molecular weight of 340 of 40% of the total weight of the Mannich-base inhibitor for decalcification and an oleic acid imidazoline corrosion inhibitor having a structural formula of

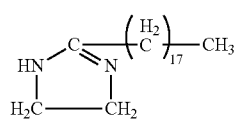

of 40% of the total weight of the Mannich-base inhibitor for decalcification were added with stirring, and blended for 2 hrs.

Embodiment 3

1 mol of tetraethylenepentaamine was added into a reactor, 5 mol of cyclohexanone, 2 mol of formaldehyde, 3 mol of trioxane (equivalent of formaldehyde) and 1 mol of an organic solvent ethanol of the which the pH value was adjusted to 4 with hydrochloric acid at a temperature of 35±5° C. were added with stirring, the temperature was controlled at 80° C., and the reaction was carried out for 1 hr. After reaction, the system was heated to 110° C. in a nitrogen atmosphere, and the reaction water was removed, to obtain a Mannich base inhibiting component. Then, the Mannich base inhibiting component of 30% of the total weight of the Mannich-base inhibitor for decalcification was cooled to 45° C., and then, at normal pressure, a naphthenic acid imidazoline corrosion inhibitor having a structural formula of

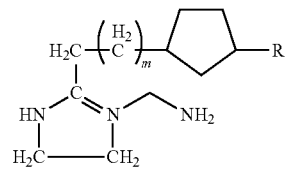

and an average molecular weight of 310 of 30% of the total weight of the Mannich-base inhibitor for decalcification, an alkynoxy methyl benzyl ammonium chloride of 20% of the total weight of the Mannich-base inhibitor for decalcification, and a tetradecyldipropynoxy methylamine corrosion inhibitor of 20% of the total weight of the Mannich-base inhibitor for decalcification were added with stirring, and blended for 3 hrs.

Embodiment 4

4 mol of acetophenone and 4 mol of formaldehyde were respectively added into a reactor, the pH value was adjusted to 6 with hydrochloric acid, the temperature was controlled at 45±5° C., and the mixture was stirred for 30 min. 1 mol of triethylenetetraamine and 0.5 mol of an organic solvent ethanol were added into the reactor with stirring, the temperature was controlled at 90° C., and the reaction was carried out for 1.5 hrs. After reaction, the system was heated to 110° C. in a nitrogen atmosphere, and the reaction water was removed, to obtain a Mannich base inhibiting component. Then, the Mannich base inhibiting component of 40% of the total weight of the Mannich-base inhibitor for decalcification was cooled to 40° C., and then, at normal pressure, a naphthenic acid imidazoline corrosion inhibitor having a structural formula of

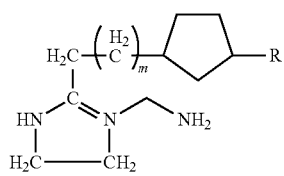

and an average molecular weight of 430 of 10% of the total weight of the Mannich-base inhibitor for decalcification, an oleic acid imidazoline corrosion inhibitor having a structural formula of

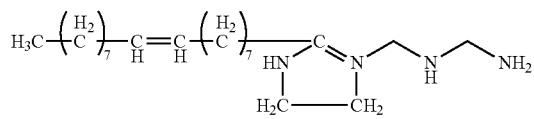

of 40% of the total weigh of the Mannich-base inhibitor for decalcification, and an isopropyl dipropynoxy methylamine corrosion inhibitor of 10% of the total weight of the Mannich-base inhibitor for decalcification were added with stirring, and blended for 1.5 hrs.

Embodiment 5

7 mol of 2-methylcyclopentanone and 7 mol of formaldehyde were respectively added into a reactor, the pH value was adjusted to 5 with acetic acid, the temperature was controlled at 20° C., and the mixture was stirred for 20 min. 1 mol of hexaethyleneheptaamine and 3 mol of an organic solvent petroleum ether were added into the reactor with stirring, the temperature was controlled at 90° C., and the reaction was carried out for 2.5 hrs. After reaction, the system was heated to 110° C. in a nitrogen atmosphere, and the reaction water was removed, to obtain a Mannich base inhibiting component. Then, the Mannich base inhibiting component of 50% of the total weight of the Mannich-base inhibitor for decalcification was cooled to 45° C., and then, at normal pressure, an oleic acid imidazoline corrosion inhibitor having a structural formula of

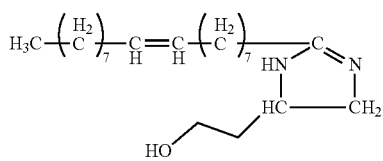

of 5% of the total weight of the Mannich-base inhibitor for decalcification, a naphthenic acid imidazoline corrosion inhibitor having a structural formula of

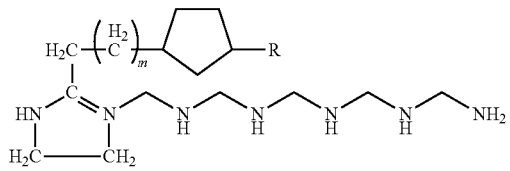

and an average molecular of 750 of 20% of the total weight of the Mannich-base inhibitor for decalcification, a butyl dipropynoxy methylamine of 25% of the total weight of the Mannich-base inhibitor for decalcification, and a decyldipropynoxy methylamine corrosion inhibitor of 25% of the total weight of the Mannich-base inhibitor for decalcification were added with stirring, and blended for 2.5 hrs.

Embodiment 6

2 mol of pentanone, 2 mol of acetone and 5 mol of formaldehyde were respectively added into a reactor, the pH value was adjusted to 2 with hydrochloric acid, the temperature was controlled at 30° C., and the mixture was stirred for 25 min. 1 mol of triethylenetetraamine and 3 mol of an organic solvent ethanol were added into the reactor with stirring, the temperature was controlled at 65° C., and the reaction was carried out for 2 hrs. After reaction, the system was heated to 110° C. in a nitrogen atmosphere, and the reaction water was removed, to obtain a Mannich base inhibiting component. Then, the Mannich base inhibiting component of 60% of the total weight of the Mannich-base inhibitor for decalcification was cooled to 40° C., and then, at normal pressure, an oleic acid imidazoline corrosion inhibitor having a structural formula of

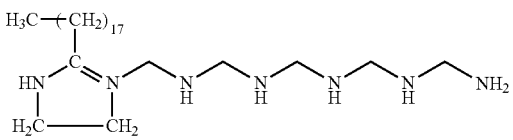

of 15% of the total weight of the Mannich-base inhibitor for decalcification, a benzoic acid imidazoline corrosion inhibitor having a structural formula of

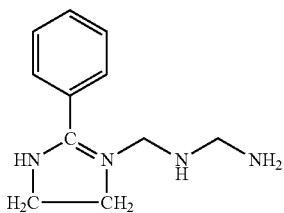

10% of the total weight of the Mannich-base inhibitor for decalcification, and a naphthenic acid imidazoline corrosion inhibitor having a structural formula of

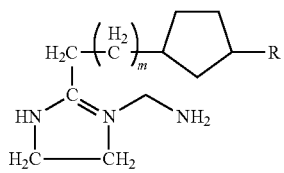

and an average molecular weight of 310 of '15% of the total weight of the Mannich-base inhibitor for decalcification were added with stirring, and blended for 3 hrs.

Embodiment 7

4 mol of butanone-2 and 6 mol of formaldehyde were respectively added into a reactor, the pH value was adjusted to 3.5 with hydrochloric acid, the temperature was controlled at 40° C., and the mixture was stirred for 30 min. 1 mol of diethylenetriamine and 4 mol of an organic solvent methanol were added into the reactor with stirring, the temperature was controlled at 60° C., and the reaction was carried out for 2.5 hrs. After reaction, the system was heated to 110° C. in a nitrogen atmosphere, and the reaction water was removed, to obtain a Mannich base inhibiting component. Then, the Mannich base inhibiting component of 70% of the total weight of the Mannich-base inhibitor for decalcification was cooled to 50° C., and then, at normal pressure, a chclohexyl dipropynoxy methylamine of 10% of the total weight of the Mannich-base inhibitor for decalcification and a dodecyldipropynoxy methylamine corrosion inhibitor of 20% of the total weight of the Mannich-base inhibitor for decalcification were added with stirring, and blended for 2 hrs.

Embodiment 8

0.2 mol of tetraethylenepentaamine and 0.8 mol of diethylenetriamine were respectively added into a reactor, 3.5 mol of pentanone, 3.5 mol of formaldehyde and 2.5 mol of an organic solvent ethanol of which the pH value was adjusted to 5.5 with hydrochloric acid at a temperature of 45° C. were added with stirring, the temperature was controlled at 90° C., and the reaction was carried out for 2 hrs. After reaction, the system was heated to 110° C. in a nitrogen atmosphere, and the reaction water was removed, to obtain a Mannich base inhibiting component. Then, the Mannich base inhibiting component of 80% of the total weight of the Mannich-base inhibitor for decalcification was cooled to 40° C., and then, at normal pressure, a dimethyl acetic acid imidazoline corrosion inhibitor having a structural formula of

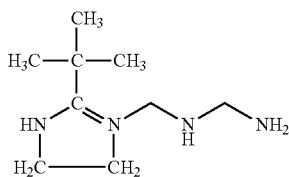

20% of the total weight of the Mannich-base inhibitor for decalcification was added with stirring, and blended for 1 hr.

Embodiments 9 to 19

Corrosion inhibitor (Embodiment 1): 10% Mannich base inhibiting component+90% auxiliary corrosion inhibitor;
Corrosion system: 1% NaCl+3% organic acids (formic acid:acetic acid:propionic acid=1:1:1)+96% water
Corrosion material: 16MnR
Corrosion time: 24 hrs

TABLE 2

Evaluation results of corrosion inhibitor embodiments at different temperatures

| Embodiment | Temperature ° C. | Addition Amount of the Corrosion Inhibitor μg/g | Corrosion Inhibition Rate % | Corrosion Rate, mm/a |
|---|---|---|---|---|
| Embodiment 9 | 80 | 30 | 93.62 | 1.68 |
| Embodiment 10 | 100 | 100 | 97.79 | 0.74 |
| Embodiment 11 | 125 | 500 | 99.03 | 0.46 |
| Embodiment 12 | 140 | 1300 | 98.83 | 1.02 |
| Embodiment 13 | 150 | 1800 | 99.01 | 0.97 |
| Embodiment 14 | 160 | 2000 | 99.28 | 1.24 |
| Embodiment 15 | 45 | 50 | 98.20 | 0.51 |
| Embodiment 16 | 80 | 200 | 98.75 | 0.33 |
| Embodiment 17 | 100 | 800 | 99.19 | 0.27 |
| Embodiment 18 | 130 | 1000 | 99.36 | 0.30 |
| Embodiment 19 | 130 | 1500 | 99.56 | 0.21 |

Embodiments 20 to 31

Corrosion inhibitor (Embodiment 5): 50% main corrosion inhibitor+50% auxiliary corrosion inhibitor;
Corrosion system: 3% inorganic salts (KCl:NaCl=1:1)+1% organic acids (formic acid:propionic acid:acetic anhydride=1:1:1)+96% water
Corrosion material: 16MnR
Corrosion time: 24 hrs

TABLE 3

Evaluation results of corrosion inhibitor embodiments at different temperatures

| Embodiment | Temperature ° C. | Addition Amount of the Corrosion Inhibitor μg/g | Corrosion Inhibition Rate % | Corrosion Rate mm/a |
|---|---|---|---|---|
| Embodiment 20 | 45 | 30 | 97.23 | 0.70 |
| Embodiment 21 | 80 | 80 | 94.84 | 1.36 |
| Embodiment 22 | 100 | 150 | 98.44 | 0.52 |
| Embodiment 23 | 125 | 200 | 99.49 | 0.44 |
| Embodiment 24 | 125 | 300 | 99.58 | 0.37 |
| Embodiment 25 | 130 | 500 | 99.50 | 0.62 |
| Embodiment 26 | 130 | 800 | 99.63 | 0.45 |
| Embodiment 27 | 140 | 1000 | 99.56 | 0.62 |
| Embodiment 28 | 140 | 1200 | 99.62 | 0.52 |
| Embodiment 29 | 150 | 1500 | 99.52 | 0.71 |
| Embodiment 30 | 160 | 1700 | 99.49 | 0.79 |
| Embodiment 31 | 160 | 2000 | 99.19 | 1.27 |

Embodiments 32 to 41

Corrosion inhibitor (Embodiment 10): 80% main corrosion inhibitor+20% auxiliary corrosion inhibitor;
Corrosion system: 1% MgCl+20% inorganic acids (hydrochloric acid:hydrofluoric acid=1:1)+79% water
Corrosion material: 16MnR
Corrosion time: 24 hrs

TABLE 4

Evaluation results of corrosion inhibitor embodiments at different temperatures

| Embodiment | Temperature ° C. | Addition Amount of the Corrosion Inhibitor μg/g | Corrosion Inhibition Rate % | Corrosion Rate mm/a |
|---|---|---|---|---|
| Embodiment 32 | 45 | 30 | 95.49 | 1.41 |
| Embodiment 33 | 80 | 50 | 92.64 | 1.12 |

TABLE 4-continued

Evaluation results of corrosion inhibitor embodiments at different temperatures

| Embodiment | Temperature °C. | Addition Amount of the Corrosion Inhibitor μg/g | Corrosion Inhibition Rate % | Corrosion Rate mm/a |
|---|---|---|---|---|
| Embodiment 34 | 100 | 100 | 95.12 | 2.11 |
| Embodiment 35 | 100 | 300 | 98.20 | 0.78 |
| Embodiment 36 | 120 | 700 | 96.72 | 2.13 |
| Embodiment 37 | 140 | 1000 | 98.81 | 1.36 |
| Embodiment 38 | 130 | 1200 | 99.28 | 0.79 |
| Embodiment 39 | 130 | 1500 | 99.45 | 0.60 |
| Embodiment 40 | 150 | 1800 | 99.14 | 0.94 |
| Embodiment 41 | 160 | 1200 | 98.83 | 1.44 |

The foregoing embodiments indicate that, when the Mannich-base inhibitor for decalcifications of 30 to 2000 μg/g relative to the corrosive media are added to an aqueous solution of a water-soluble acid corrosive medium containing a water-soluble inorganic salt at 45° C. to 160° C., the corrosion inhibition rate for a 16MnR material may be over 90%.

Embodiments 42 to 52

Corrosion material: 16MnR
Corrosion time: 24 hrs

TABLE 5

Evaluation results of application embodiments of corrosive media of different concentrations

| Embodiment | Inorganic Salt % | Acid % | Water % | Addition Amount of the Corrosion Inhibitor μg/g | Corrosion Inhibition Rate % | Corrosion Rate mm/a |
|---|---|---|---|---|---|---|
| Embodiment 42 | 20 | 80 | / | 2000 | 93.25 | 9.51 |
| Embodiment 43 | 10 | 60 | 30 | 1500 | 93.77 | 8.70 |
| Embodiment 44 | 15 | 50 | 35 | 1000 | 94.82 | 8.11 |
| Embodiment 45 | 5 | 30 | 65 | 700 | 94.97 | 6.63 |
| Embodiment 46 | 3 | 10 | 87 | 600 | 96.03 | 5.84 |
| Embodiment 47 | 2 | 5 | 93 | 400 | 99.10 | 0.82 |
| Embodiment 48 | 1 | 2.5 | 96.5 | 200 | 93.18 | 4.73 |
| Embodiment 49 | 0.5 | 1.0 | 98.5 | 100 | 92.56 | 3.60 |
| Embodiment 50 | 0.1 | 0.5 | 99.4 | 80 | 92.23 | 3.22 |
| Embodiment 51 | / | 10 | 90 | 50 | 87.45 | 4.14 |
| Embodiment 52 | 5 | / | 95 | 30 | 92.10 | 0.97 |

Embodiments 42 to 52 indicate that, in corrosive media of different concentrations, the corrosion inhibition rate of 30 to 2000 μg/g Mannich-base inhibitor for decalcification on the 16MnR material may be over 90%.

The above technical features forms the embodiments of the present invention, which have strong adaptability and good implementation effect, and non-essential technical features can be added or removed according to actual needs, so as to meet needs of different situations.

INDUSTRIAL APPLICABILITY

The present invention adopts the above technical solutions, and compared with the prior art, has the following advantages:

In the corrosion inhibitor prepared by the present invention, the amine component of the main reaction raw material is an organic polyamine containing more than three primary amino groups and/or secondary amino groups, the organic polyamine is added to an excessive amount of a ketone and an aldehyde in such a manner that at least three primary amino groups and/or secondary amino groups of the organic polyamine respectively are subjected to a Mannich reaction with the ketone and the aldehyde, so that functional group graft of multiple amino groups is performed by fully using the organic polyamine, to obtain a Mannich-base inhibitor having a multi-branched spatial structure, thereby increasing the adsorption centers of the resulting product. Therefore, the product can form a multi-point adsorption with a metal surface, and the formed adsorption membrane is firm, and the adsorption is strong. At the same time, the molecular chain length of the Mannich-base inhibitor having a spatial structure is greater than linear Mannich bases in the prior art, and when the metal wall surface has been eroded or is not smooth, the Mannich base having a spatial structure can exhibit good corrosion inhibition effect through bridging or multi-molecular wound bridging. Therefore, the Mannich-base inhibitor for decalcification prepared with the Mannich base having a spatial structure can overcome the disadvantages in the prior art that the number of the adsorption centers of the corrosion inhibitor is small, the species of the adsorption group is single, and the adsorption with the metal surface is not strong. The Mannich-base inhibitor for decalcification is applicable to an aqueous solution of various inorganic acids and organic acid corrosive media containing a water-soluble inorganic salt, especially a mixed media of salts, acids and water below 160° C. from a cure oil desalting and dewatering unit of a refinery; the decalcification and corrosion-inhibition agent can be effectively formulated with a crude oil demulsifier and a crude oil decalcifying agent to achieve a synergistic effect, the performance is stable, the adsorption is strong, the strength of the formed membrane is high, the membrane compactness is high, and the corrosion inhibition rate can be over 90%, so that the corrosion requirements of units and plants. The corrosion inhibiting agent has the advantages of simple and easy production and low energy consumption, and is applicable to pipelines and facilities of oilfield wastewater treatment and re-injection sewage system in the process of petroleum refining and petrochemical processing, especially applicable to inhibition of erosion of a mixed media of salts, acids and water below 160° C. from a cure oil desalting and dewatering unit of a refinery on steel.

The invention claimed is:

1. A composition for inhibiting corrosion, the composition comprising: a multi-branched Mannich-base inhibiting component of 10% to 80% of the total weight of the composition and one or more of imidazoline corrosion inhibitors and alkynoxy amine corrosion inhibitors as the balance, wherein the multi-branched Mannich-base inhibiting component is prepared from 1 mol of an organic polyamine containing three or more primary amino groups and/or secondary amino groups, 3 to 7 mol of a ketone and 3 to 7 mol of an aldehyde though Mannich reaction.

2. The composition according to claim 1, wherein the molecular weight of the imidazoline corrosion inhibitor is 110 to 750.

3. The composition according to claim 1, wherein the alkynoxy amine corrosion inhibitor comprises one or more of an alkynoxy methylamine, an alkynoxy methyl benzyl ammonium chloride, isopropyldipropynoxy methylamine, butyldipropynoxy methylamine, cyclohexyldipropynoxy methylamine, n-hexyldipropynoxy methylamine, octyldipropynoxy methylamine, decyldipropynoxy methylamine, dodecyldipropynoxy methylamine, and tetradecyldipropynoxy methylamine.

4. A method for preparing the composition according to claim 1, comprising:
(1) preparation of a multi-branched Mannich-base inhibiting component: adding 3 to 7 mol of a ketone and 3 to 7 mol of an aldehyde into a reactor, adjusting the pH value to 2 to 6 with an acid, controlling the temperature at 20° C. to 50° C., stirring for 20 to 30 min, and adding 1 mol of an organic polyamine and an organic solvent into the reactor with stirring; or adding a ketone, an aldehyde and an organic solvent, of which the pH value has been adjusted, to an organic polyamine, controlling the temperature at 60° C. to 90° C., and reacting for 1 to 3 hrs; and after reaction, heating the system to 110° C. in an nitrogen atmosphere, and removing the reaction water; and
(2) cooling the multi-branched Mannich-base inhibiting component to 40° C. to 50° C., and at normal pressure, adding one or more of imidazoline corrosion inhibitors and alkynoxy methylamine corrosion inhibitors with stirring, and blending for 1 to 3 hrs.

5. The method for preparing the composition according to claim 4, wherein the ketone comprises one or more of an aliphatic ketone, an alicyclic ketone and an aromatic ketone.

6. The method for preparing the composition according to claim 5, wherein a cyclic inner ketone in the alicyclic ketone comprises cyclohexanone, cyclopentanone, cycloheptanone, o-methyl cyclohexanone, p-methyl cyclohexanone, 2-methylcyclopentanone, 2-ethylcyclopentanone, 3-ethylcyclopentanone; and the aliphatic ketone, the aromatic ketone or other alicyclic ketones are represented by the following formula:

wherein $R_1$ and $R_2$ each independently represents a $C_1$ to $C_6$ alkyl, a $C_6$ to $C_9$ linear or branched aryl, and a $C_5$ to $C_9$ linear or branched cycloalkyl.

7. The method for preparing the composition according to claim 4, wherein the aldehyde is formaldehyde.

8. The method for preparing the composition according to claim 4, wherein the organic polyamine is an organic compound containing three or more primary amino groups and/or secondary amino groups.

9. The method for preparing the composition according to claim 4, wherein the organic polyamine comprises one or more of diethylenetriamine, triethylenetetramine, tetraethylenepentamine, pentaethylenehexamine, and hexaethyleneheptaamine.

10. A process of using the composition according to claim 1, comprising adding 30 to 2000 μg of the composition per g of corrosive media and mixing uniformly.

11. The process according to claim 10, wherein the corrosive media is a mixed aqueous solution of a water-soluble inorganic salt and a water-soluble acid.

12. The process according to claim 11, wherein the water-soluble inorganic salt is one or more of soluble potassium salts, sodium salts and magnesium salts.

13. The process according to claim 11, wherein the water-soluble acid is one or more of water-soluble inorganic acids and water-soluble organic acids.

14. The process according to claim 13, wherein the water-soluble inorganic acid and the water-soluble organic acid are one or more of hydrochloric acid, hydrofluoric acid, formic acid, acetic acid, propionic acid and acetic anhydride.

* * * * *